United States Patent [19]

Jehle

[11] Patent Number: 4,635,880
[45] Date of Patent: Jan. 13, 1987

[54] REMOTE CONTROL SYSTEM FOR A MISSILE

[75] Inventor: Franz Jehle, Ulm, Fed. Rep. of Germany

[73] Assignee: Licentia Patent-Verusaltungs GmbH, Frankfurt, Fed. Rep. of Germany

[21] Appl. No.: 697,504

[22] Filed: Feb. 1, 1985

[30] Foreign Application Priority Data

Feb. 2, 1984 [DE] Fed. Rep. of Germany ....... 3403558

[51] Int. Cl.$^4$ ................................................ F41G 7/30
[52] U.S. Cl. ................................................... 244/3.14
[58] Field of Search ......................................... 244/3.14

[56] References Cited

U.S. PATENT DOCUMENTS

| | | | |
|---|---|---|---|
| 2,950,477 | 8/1960 | Alpers | 244/3.14 |
| 3,856,237 | 12/1974 | Torian et al. | 244/3.14 |
| 3,902,684 | 9/1975 | Queeney | 244/3.14 |

FOREIGN PATENT DOCUMENTS 2024305 8/1970 France .

OTHER PUBLICATIONS

Grant, P. M. et al; IEEE Proceeding Section A-K; "Introduction to Electronic Warfare"; vol. 129, Jun. 1982; pp. 113-132.

Primary Examiner—Charles T. Jordan
Attorney, Agent, or Firm—McGlew and Tuttle

[57] ABSTRACT

In a remote-control system for guiding a missile from an aircraft which is equipped with jamming transmitters, a radar, and a predictor, radio communication to the missile is established to transmit trajectory instructions through the jamming transmitter equipment. For this purpose, after launching the missile, the jamming transmitter is tuned in a narrow band to the frequency of the radio communication, while interrupting the jamming transmission if necessary, and modulated with the instructions to be transmitted.

4 Claims, 2 Drawing Figures

REMOTE CONTROL SYSTEM FOR A MISSILE

FIELD AND BACKGROUND OF THE INVENTION

The invention relates to a remote-control system for a missile.

Electrical radio-frequency equipment in aircraft usually comprise, among others, radar for locating targets present in the flight direction, and jamming transmitters for disturbing an adversary's position-finding installations or radio communications. With a missile launched from the aircraft in the direction of a target detected by the radar, the necessity arises in addition, at least for homing by means of target locating devices carried by the missile, to supply the missile through radio communication with trajectory instructions which are computed in the aircraft by a predictor from the radar data.

SUMMARY OF THE INVENTION

The present invention is directed to a remote-control system for a missile of the described kind, for reliably effecting such a remote control at low cost.

The present invention comprises a remote-control system for guiding a missile to a target through radio-frequency communication from an aircraft which equipped with a broadband jamming transmitter, radar with a radar antenna for locating targets, and a predictor for computing a necessary trajectory of the missile from target locating data of the radar, characterized in that the broadband jamming transmitted comprises a directional antenna whose directive pattern points substantially in the flight direction of the aircraft and has a very large halfpower width as compared to the pattern of the radar antenna, and that after launching the missile, a control device tunes the jamming transmitter at regular time intervals in a narrow band to the frequency of the radio communication with the missile.

The invention ensures a safe transmission of instructions from the aircraft to the missile, without additional transmitting and antenna installations. In instances in which a variably controlled modulator is provided in the jamming transmitter equipment, the modulator may advantageously also be employed for the modulation of control messages.

Due to the multiple utilization of the jamming transmitter equipment, the inventive solution is extremely cost-effective. Due to the relatively large halfpower width of the directive pattern of the jamming directional antenna, the missile remains constantly within the major lobe of this directive pattern, with the result of a satisfactory energy balance of the radio communication for all positions along the trajectory. This in turn results in a high security of the remote control against jamming. During the transmission of guidance instructions, jamming must be interrupted, which is negligible, however, since the periods of time needed for transmitting the instructions are very short, such as 20 ms in intervals of 0.5 s.

DESCRIPTION OF THE PREFERRED EMBODIMENT

By means of a radar RA provided in an aircraft F and having a strongly focused directive pattern DR (hatched), a target Z is aquired. A missile FK launched from the aircraft in the direction of the target is supplied from the aircraft through radio communication by means of a jamming transmitter equipment SE with trajectory instructions which are computed from the target position-finding results of the radar. The major lobe of the directive pattern DS of the directional antenna of the jamming transmitter is substantially broader than the directive pattern of the radar antenna. Within the major lobe DS, the effectively transmitted power is so high that a satisfactory energy balance of the radio communication is obtained at anytime. Due to the large halfpower width, the missile FK can home in on the targets even along a considerably curved trajectory departing from the direct connecting line and intended to reduce the detection probability, without unfavorably affecting the radio communication. To eliminate strong shade-off effects, the directional antenna of the jamming transmitter is mounted on the wing, as far outside on the wing as possible.

Figure 1:
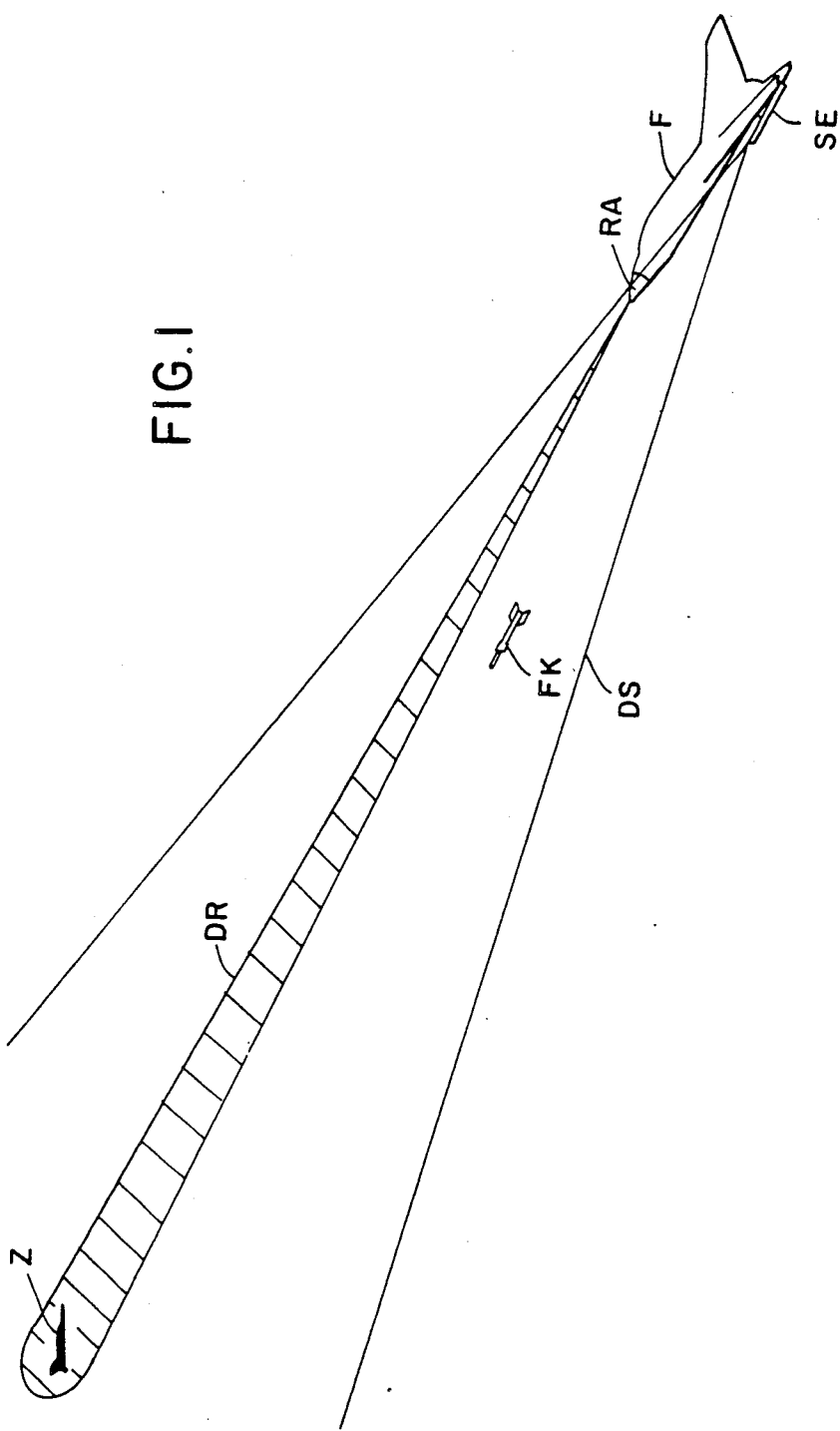
FIG. 1 is an explanatory diagram of how the invention operates.
Figure 2:
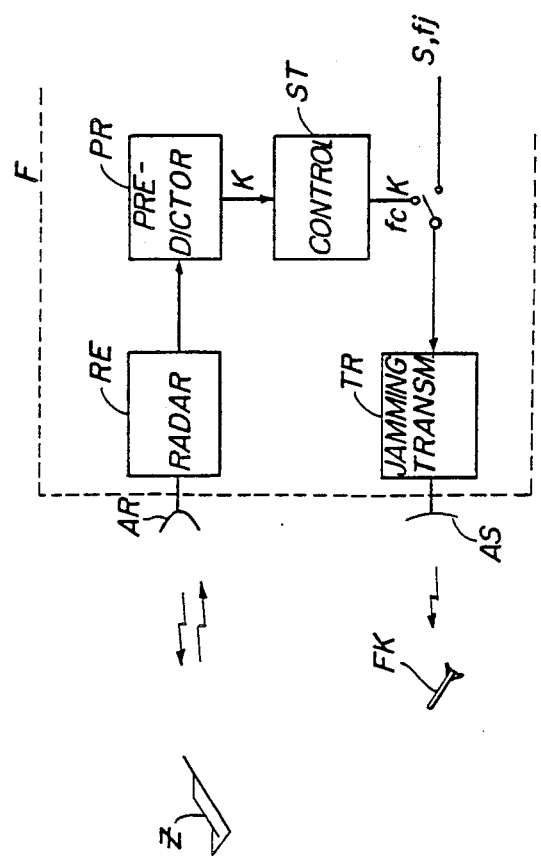
FIG. 2 is a block diagram showing the structure of the present invention.

As shown in FIG. 2, the aircraft F carries radar equipment which includes radar set RE with directional radar antenna AR. Radar set RE generates target position finding results in the form of radar data supplied to a predictor PR. Predictor PR calculates trajectory instructions K using the radar data and supplies it to a control device ST which is connected by selector switch 2 to the jamming transmittor TR. Jamming transmitter TR receives the trajectory instructions which are applied at a frequency sc to the jamming transmitter TR which transmits the signals over the jamming directional antenna AS. The jamming transmitter is switches to receive the trajectory instructions for only a very short time, such as 20 ns in intervals of 0.5 s. During the remaining time, the jamming transmitter receives jamming signal S at a jamming frequency sj.

I claim:

1. A remote control system of guiding a missile to a target through radio-frequency communication from an aircraft which is equipped with a broadband jamming transmitter, radar with a radar antenna for locating targets, and a predictor for computing a necessary trajectory of the missile from target locating data of the radar characterized in that the broadband jamming transmitter comprises a directional antenna whose directive pattern points substantially in the flight direction on the aircraft and has a very large halfpower width as compared to the pattern of the radar antenna, and that after launching the missile, a control device tunes the jamming transmitter at regular time intervals and in a narrow band to the frequency of radio communication with the missile, while interrupting the transmission of jamming signals if necessary, and transmits to the missile trajectory control instructions.

2. A device according to claim 1, characterized in that the directional antenna is provided at the outer end of a wing of the aircraft.

3. A remote control system for guiding a missile from an aircraft to a target using missile trajectory control instructions and while the aircraft is flying in a flight direction, comprising:

a broadband jamming transmitter mounted on the aircraft and having a directional antenna for transmitting radio-frequency jamming and communication signals in a directional pattern having a major lobe facing forwardly with respect to the aircraft flight direction;

radar mounted on the aircraft and having a radar antenna for generating a focussed directional pattern to locate a target, said radar generating locating data using said focussed directional pattern, said focussed directional pattern being within said major lobe of said directional antenna and being narrower than said major lobe;

a predictor connected to said radar for computing a necessary trajectory of a missile from the aircraft utilizing the target locating data; and a control device connected to said jamming transmitter for tuning said jamming transmitter at regular time intervals and in a narrow band to the frequency of a radio communication between the aircraft and the missile for transmitting the computed missile trajectory to the missile that is launched from the aircraft.

4. A device according to claim 3, wherein the aircraft has wings, said directional antenna of said jamming transmitter being mounted on an outer part of one of said wings.

* * * * *